US011879277B2

(12) United States Patent
Tatemichi et al.

(10) Patent No.: US 11,879,277 B2
(45) Date of Patent: Jan. 23, 2024

(54) INSIDE HANDLE DEVICE

(71) Applicant: ALPHA CORPORATION, Kanagawa (JP)

(72) Inventors: Saeko Tatemichi, Yokohama (JP); Ryuji Minemura, Yokohama (JP); Ryoichi Tanaka, Yokohama (JP)

(73) Assignee: ALPHA CORPORATION, Kanagawa (JP)

(*) Notice: Subject to any disclaimer, the term of this patent is extended or adjusted under 35 U.S.C. 154(b) by 179 days.

(21) Appl. No.: 17/027,906

(22) Filed: Sep. 22, 2020

(65) Prior Publication Data
US 2021/0002926 A1 Jan. 7, 2021

Related U.S. Application Data

(63) Continuation of application No. PCT/JP2019/020750, filed on May 24, 2019.

(30) Foreign Application Priority Data

May 25, 2018 (JP) ................................. 2018-100189

(51) Int. Cl.
*E05B 77/38* (2014.01)
*E05B 85/12* (2014.01)

(52) U.S. Cl.
CPC .............. *E05B 77/38* (2013.01); *E05B 85/12* (2013.01)

(58) Field of Classification Search
CPC .......... E05B 77/36; E05B 77/38; E05B 77/42; E05B 85/10; E05B 85/12; E05B 85/13; E05B 85/14; E05B 85/16; Y10T 292/57
See application file for complete search history.

(56) References Cited

U.S. PATENT DOCUMENTS

| 2013/0168979 A1 | 7/2013 | Minemura |
| 2014/0217756 A1 | 8/2014 | Tanoguchi et al. |

FOREIGN PATENT DOCUMENTS

| DE | 102008058419 A1 | * | 5/2010 | ............. E05B 77/38 |
| DE | 10 2016 200 589 A1 | | 8/2016 | |
| GB | 2226849 A | * | 7/1990 | ............. E05B 77/38 |
| JP | H06-079975 A | | 3/1994 | |
| JP | H07-259393 A | | 10/1995 | |
| JP | 2007-009479 A | | 1/2007 | |
| JP | 2007009479 A | * | 1/2007 | |
| JP | 2014-152477 A | | 8/2014 | |
| JP | 2016-169548 A | | 9/2016 | |
| KR | 2005-0120458 A | | 12/2005 | |

(Continued)

OTHER PUBLICATIONS

Annotated machine translation of JP-2007009479-A (Year: 2007).*

(Continued)

*Primary Examiner* — Christine M Mills
*Assistant Examiner* — Peter H Watson
(74) *Attorney, Agent, or Firm* — Studebaker & Brackett PC

(57) ABSTRACT

An inside handle device includes a handle base attached to a door panel of a vehicle; a lock lever rotatably supported on the handle base, a stopper portion provided on the handle base and limiting a rotation range of the lock lever, and an impact absorbing portion provided on the handle base and absorbing impact generated by a contact of the lock lever with the stopper portion.

3 Claims, 8 Drawing Sheets

(56) References Cited

FOREIGN PATENT DOCUMENTS

WO    WO-2011006473 A1 *   1/2011   ............. E05B 77/38

OTHER PUBLICATIONS

The extended European search report issued by the European Patent Office dated Feb. 10, 2022, which corresponds to European Patent Application No. 19807616.8-1005 and is related to U.S. Appl. No. 17/027,906.
International Search Report issued in PCT/JP2019/020750; dated Jul. 2, 2019.

* cited by examiner

INSIDE HANDLE DEVICE

CROSS REFERENCE TO RELATED APPLICATIONS

This application is a continuation of PCT application No. PCT/JP2019/020750, which was filed on May 24, 2019 based on Japanese Patent Application No. 2018-100189 filed on May 25, 2018, the entire contents of which are incorporated herein by reference.

BACKGROUND OF THE INVENTION

Field of the Invention

The present invention relates to an inside handle device.

Description of Related Art

In the related art, an inside handle device (inside handle device for a vehicle) mounted on a door of a vehicle such as an automobile has been known.

The inside handle device includes, for example, a handle base attached to a door panel of a vehicle, a lock lever rotatably supported on the handle base, and a stopper portion provided on the handle base and limiting a rotation range of the lock lever.
[Patent Literature 1] JP-UM-H06-79975

According to a related art, at a time of locking or unlocking a door by a lock lever, the lock lever comes into contact with a stopper portion to generate an impact. Vibration of an impact is transmitted to a door panel of a vehicle via a handle base, and sound is amplified at that time. Since the amplified sound can be perceived by a vehicle occupant as an abnormal sound, it is desirable to reduce the amplified sound as much as possible.

SUMMARY

One or more embodiments provide an inside handle device in which hitting sound (impact sound) generated at the time of locking or unlocking a door by a lock lever can be reduced.

In accordance with one or more embodiments, an inside handle device includes a handle base attached to a door panel of a vehicle, a lock lever configured to be rotatably supported on the handle base, a stopper portion provided on the handle base and configured to limit a rotation range of the lock lever, and an impact absorbing portion provided on the handle base and configured to absorb an impact generated by a contact of the lock lever with the stopper portion.

DETAILED DESCRIPTION

Figure 1:
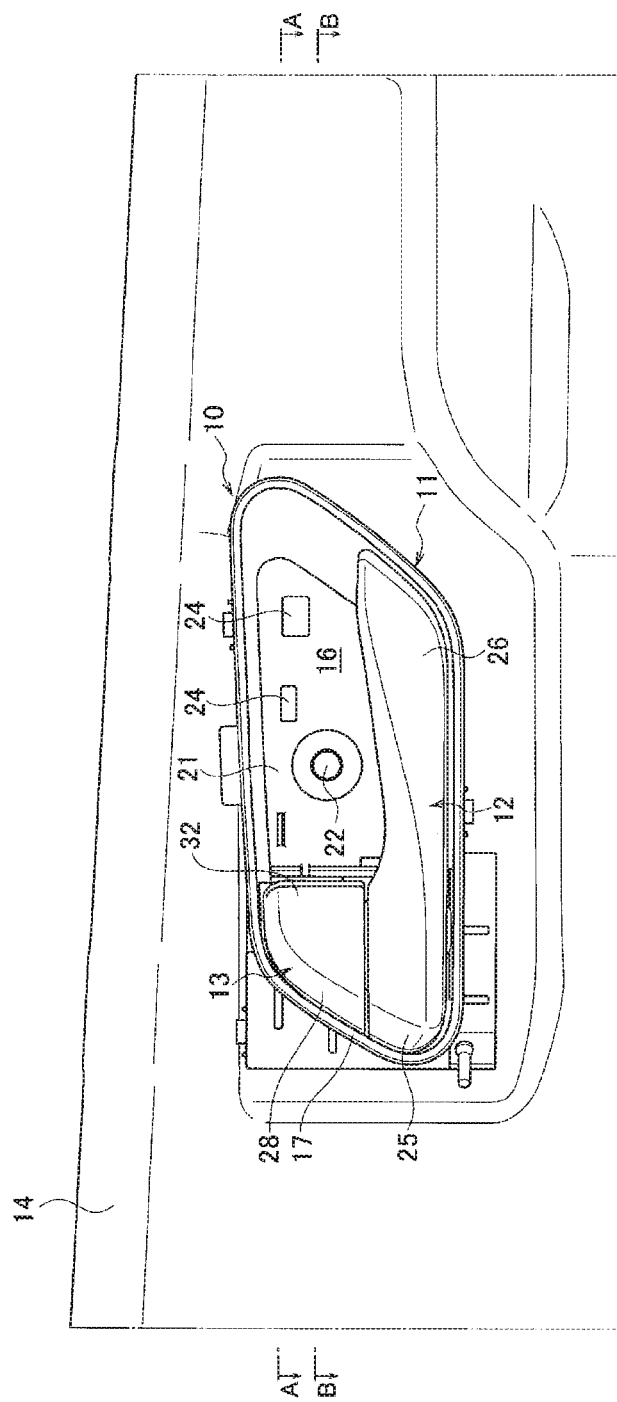
FIG. 1 is a front view of an inside handle device according to an embodiment.

Exemplary embodiments are described with reference to the drawings.

As illustrated in FIGS. 1 to 10, an inside handle device 10 includes a handle base 11, an operation handle 12, and a lock lever 13. The inside handle device 10 is fixed to an inner panel 14 that constitutes a door panel of a vehicle, and is disposed so as to be partially exposed from a door trim (not illustrated) facing a vehicle interior. Bowden cables (not illustrated) disposed inside the door panel are connected to the inside handle device 10. The Bowden cable (not illustrated) includes an outer tube having a tubular shape and an inner wire inserted into the outer tube.

The handle base 11 is formed by injection molding, for example, a synthetic resin material. The handle base 11 includes a shaft support hole 15 formed of a through hole on one side, and an operation recess 16 adjacent to the shaft support hole 15 and having a concave shape. A cover edge 17 that covers base end portions of the operation handle 12 and the lock lever 13 extends toward the operation recess 16 in the shaft support hole 15 at an edge portion of the shaft support hole 15 of the handle base 11 such that an internal structure of the door panel cannot be seen by an occupant.

Figure 2:
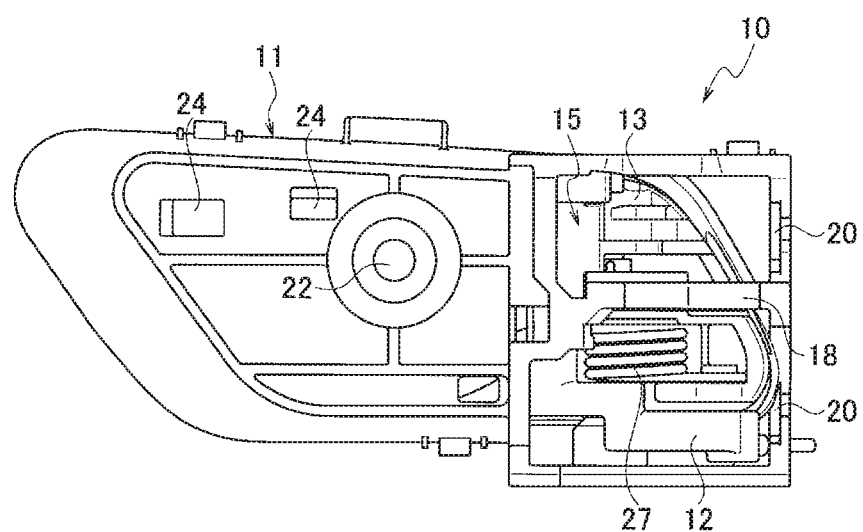
FIG. 2 is a back view of the inside handle device according to the embodiment.

The shaft support hole 15 is formed in a substantially quadrangular shape in which an upper side in FIGS. 1 and 2 is shorter than a lower side. A support beam 18 is formed in the shaft support hole 15 so as to divide the shaft support hole 15 into upper and lower parts. The support beam 18 has two support beam shapes extending in a left-right direction in FIGS. 1 and 2. Further, a handle-side support shaft (not illustrated) and a lock-side support shaft 19 are disposed so as to be bridged and supported between the support beam 18 and a peripheral edge of the shaft support hole 15. The handle-side support shaft and the lock-side support shaft 19 are arranged parallel to each other along a vehicle upper-lower direction. Further, a pair of tube holding portions 20, 20 is provided at one-side end portion of the shaft support hole 15. The tube holding portions 20, 20 hold end portions of outer tubes of the Bowden cable on an operation handle 12 side and the Bowden cable on a lock lever 13 side, respectively.

A fixing portion 22 formed of a through hole is provided on a bottom surface 21 of the operation recess 16. The inside handle device 10 is fixed to the inner panel 14 by inserting a fixing screw 23 (see FIG. 4) into the fixing portion 22 and screwing the fixing screw 23 to the inner panel 14.

Further, a plurality of holding holes 24 (at two locations in the illustrated example) that penetrate the bottom surface 21 are disposed on the bottom surface 21 of the operation recess 16. A retaining claw or an elastic claw provided on a decorative plate (not illustrative) is inserted into and engaged with these holding holes 24, and the decorative plate is disposed on and fixed to the operation recess 16.

The decorative plate (not illustrated) is disposed so as to cover the operation recess 16 from a front side of the inside handle device 10. By disposing on and fixing the decorative plate to the operation recess 16, the fixing screw 23 mounted on the operation recess 16 is covered, so that the fixing portion 22 and the fixing screw 23 are not visible to the occupant.

The operation handle 12 is rotatably supported on the handle base 11 and formed by injection molding, for example, a synthetic resin material. In the present embodiment, the operation handle 12 is formed in a so-called bar type and plated with chrome or the like. The shape of the operation handle 12 is not limited to the bar shape, and may be another shape such as a so-called ring shape. Further, a surface treatment of the operation handle 12 is not limited to plating, and may be coating such as metallic-tone coating.

In the operation handle 12, a handle shaft support portion 25 provided on a base end side serving as a rotation support point is rotatably supported in the shaft support hole 15 of the handle base 11 via the handle-side support shaft. Further, in the operation handle 12, a grip portion 26 formed on a tip end side and operated when the occupant opens a vehicle door is biased and held in the operation recess 16 by a winding spring 27. A handle-side wire holding portion (not illustrated) is disposed on the handle shaft support portion 25 of the operation handle 12, and an end portion of the inner wire of the Bowden cable on the operation handle 12 side is attached to the handle-side wire holding portion.

The lock lever 13 is rotatably supported on the handle base 11, and is formed by injection molding, for example, a synthetic resin material. The lock lever 13 is also called a lock knob, and is disposed on the handle base 11 in the vicinity of (adjacent to) the operation handle 12.

Similar to the operation handle 12, in the lock lever 13, a lock shaft support portion 28 provided on a base end side serving as a rotation support point is rotatably supported in the shaft support hole 15 of the handle base 11 via the lock-side support shaft. Further, a lock-side wire holding portion 29 is disposed in the lock shaft support portion 28 of the lock lever 13, and an end portion of the inner wire of the Bowden cable on the lock lever 13 side is connected to the lock-side wire holding portion 29.

As illustrated in FIGS. 3 to 6, the lock lever 13 includes a locking side stopper ridge 30 formed corresponding to a locking position (lock position) and an unlocking side stopper ridge 31 formed corresponding to an unlocking position (unlock position). Further, the lock lever 13 includes an operation ridge 32. When the occupant operates the operation ridge 32 with a finger, the lock lever 13 can be rotated between a locking side rotation limit illustrated in FIGS. 3 and 5 and an unlocking side rotation limit illustrated in FIGS. 4 and 6.

Figure 5:
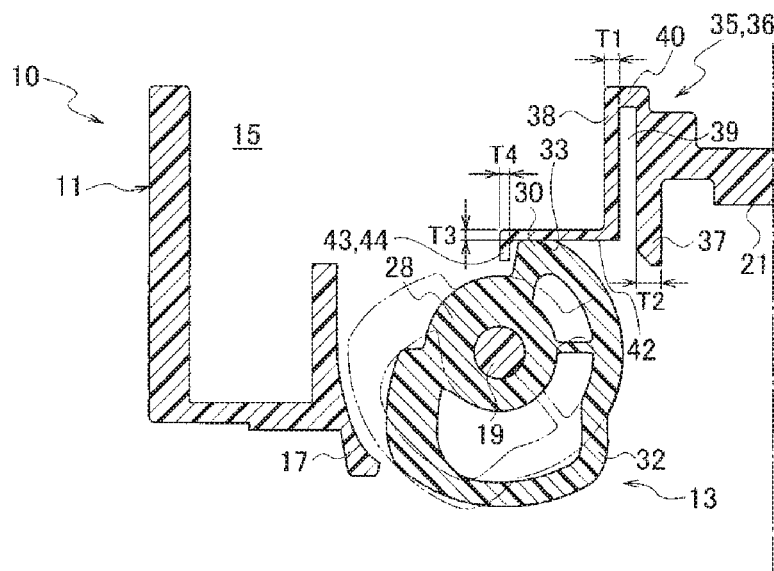
FIG. 5 is an enlarged view of a main part in FIG. 3.

As illustrated in FIG. 5, when the lock lever 13 is in the locking position, the locking side stopper ridge 30 abuts on the locking side stopper 33 to-be-described blow that is formed on the handle base 11 to define the locking side rotation limit of the lock lever 13.

Figure 6:
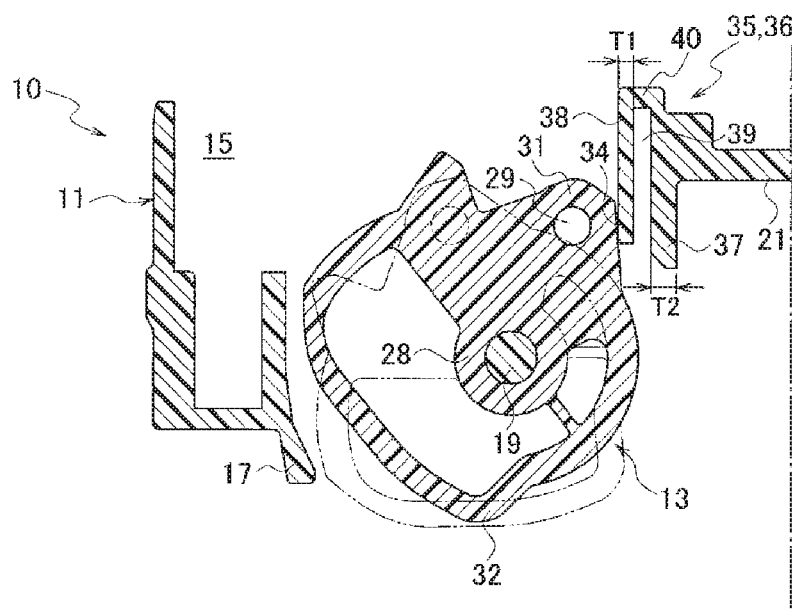
FIG. 6 is an enlarged view of a main part in FIG. 4.
Figure 7:
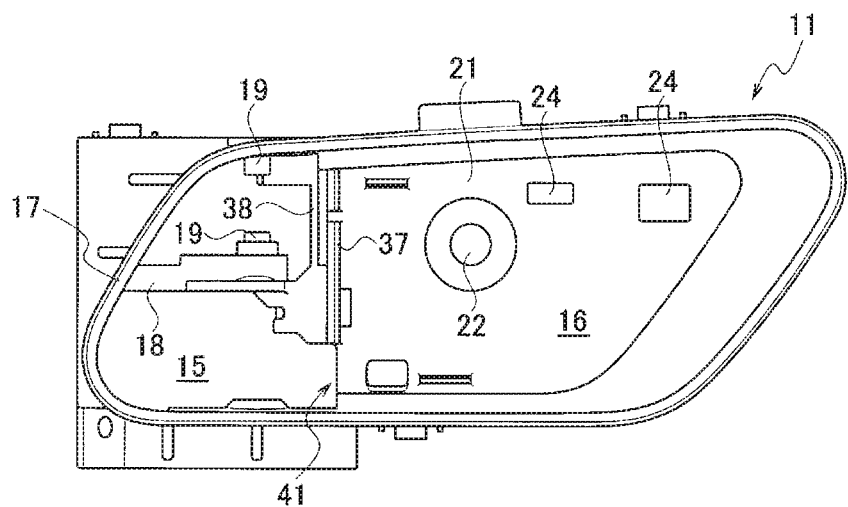
FIG. 7 is a front view of a single handle base.
Figure 8:
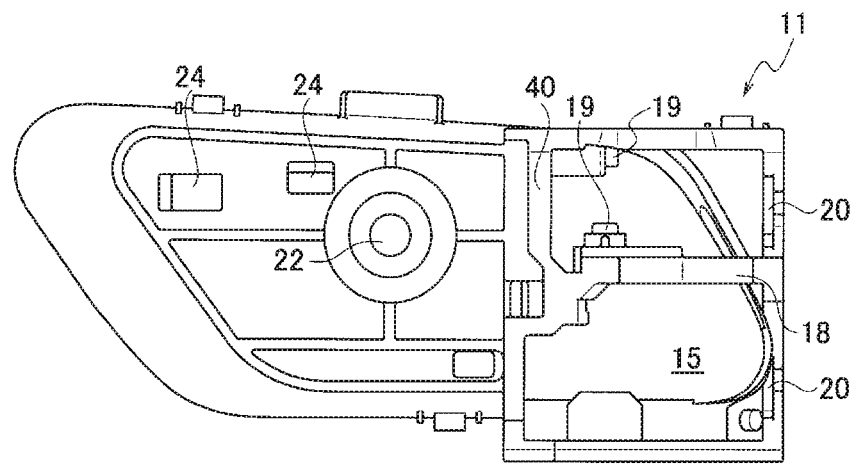
FIG. 8 is a back view of the single handle base.
Figure 9:
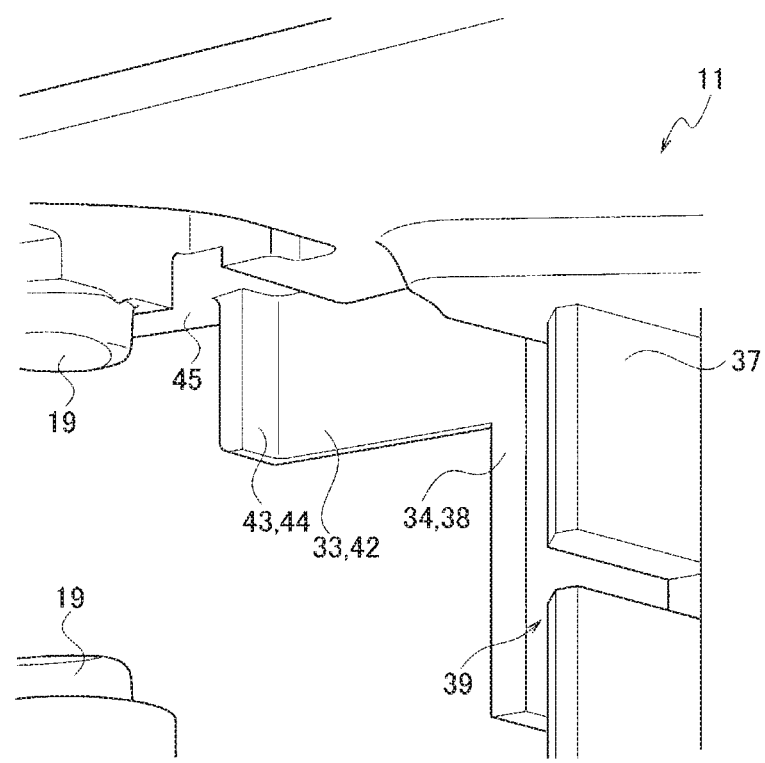
FIG. 9 is an enlarged perspective view of a main part of the handle base as seen from a front side.
Figure 10:
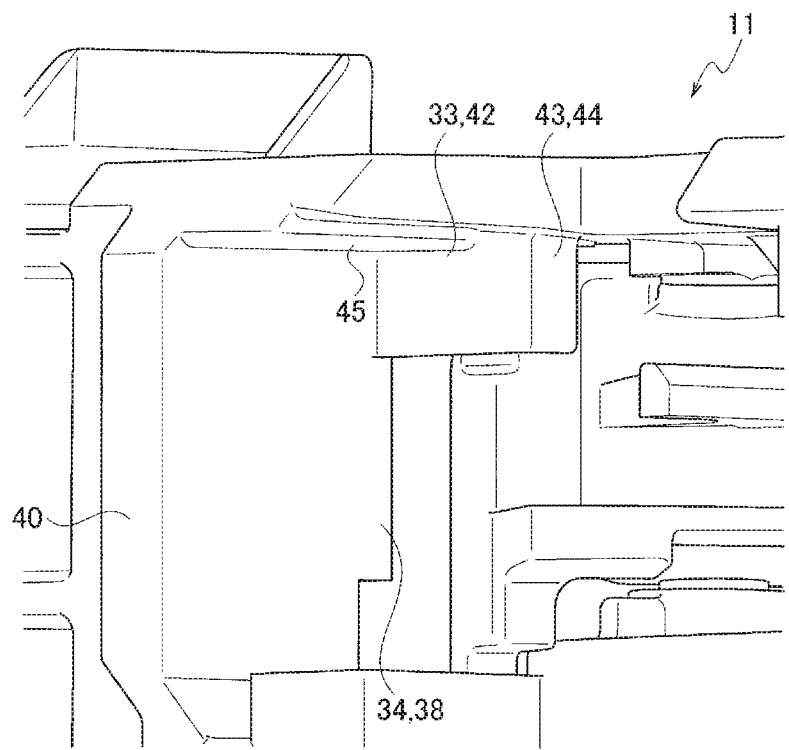
FIG. 10 is an enlarged perspective view of a main part of the handle base as seen from a back side.

When the lock lever 13 is rotated from the state illustrated in FIG. 5 to an unlocking position side, as illustrated in FIG. 6, the unlocking side stopper ridge 31 abuts on an unlocking side stopper 34 to-be-described blow that is formed on the handle base 11 to define the unlocking side rotation limit of the lock lever 13.

The inside handle device 10 includes a stopper portion 35 provided on the handle base 11 and limiting a rotation range of the lock lever 13, and an impact absorbing portion 36 provided on the handle base 11 and absorbing an impact generated by a contact of the lock lever 13 with the stopper portion 35.

Hereinafter, a specific configuration example of the impact absorbing portion 36 and the stopper portion 35 will be described.

As illustrated in FIGS. 3 to 10, a partition wall portion 37 is disposed on the handle base 11 at a position between the shaft support hole 15 and the operation recess 16 to partition the shaft support hole 15 and the operation recess 16. Further, an impact absorbing wall portion (elastic portion) 38 is disposed on the handle base 11 in a way of being apart from the partition wall portion 37 constituting a part of the peripheral edge of the shaft support hole 15 of the handle base 11. A slit 39 is formed between the partition wall portion 37 of the handle base 11 and the impact absorbing wall portion 38, and the partition wall portion 37 and the impact absorbing wall portion 38 are connected by a connecting portion 40 at an end portion on an inner panel 14 side.

A wall thickness T1 of the impact absorbing wall portion 38 is formed to be thinner than a wall thickness T2 of the partition wall portion 37 constituting a part of the peripheral edge of the shaft support hole 15 of the handle base 11 (see FIGS. 5 and 6). This is because by allowing the impact absorbing wall portion 38 to slightly bend at the time of abutment on (collision with) the lock lever 13, the vibration is damped and the impact is absorbed by the small deflection deformation. A cutout portion 41 is provided at the partition wall portion 37 of the shaft support hole 15 and the impact absorbing wall portion 38 so as not to interfere with the operation handle 12 that is in an initial position illustrated in FIG. 1 (see FIG. 7).

The impact absorbing portion 36 includes a first protruding piece portion (elastic portion) 42 protruding from the impact absorbing wall portion 38 and extending into the shaft supporting hole 15, and the locking side stopper (locking side first stopper) 33 defining the locking side rotation limit of the lock lever 13 is formed on the protruding piece portion 42 (see FIG. 5). An extending direction of the first protruding piece portion 42 (the locking side stopper 33) is set to an angle substantially orthogonal to the impact absorbing wall portion 38. Further, in order to ensure rigidity of the locking side stopper 33 to a certain degree, the first protruding piece portion 42 does not have a full cantilever shape, and one-side end portion thereof is connected to a wall portion 45 constituting a part of the peripheral edge of the shaft support hole 15 (see FIGS. 9 and 10).

Figure 3:
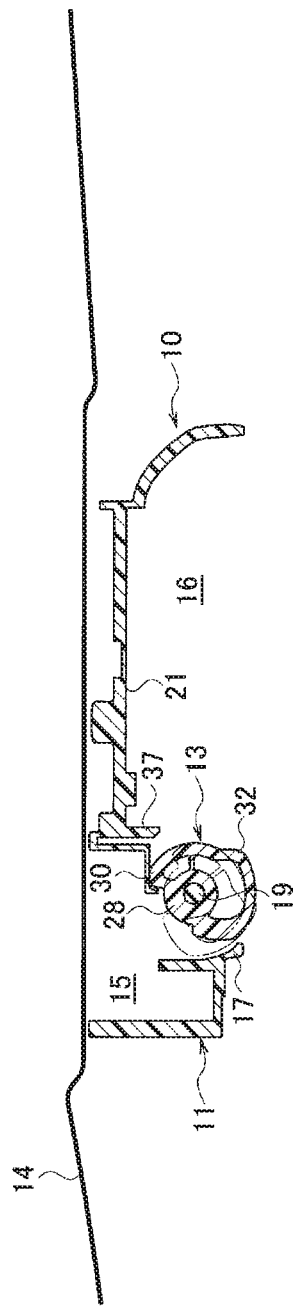
FIG. 3 is a cross-sectional view taken along a line A-A in FIG. 1.
Figure 4:
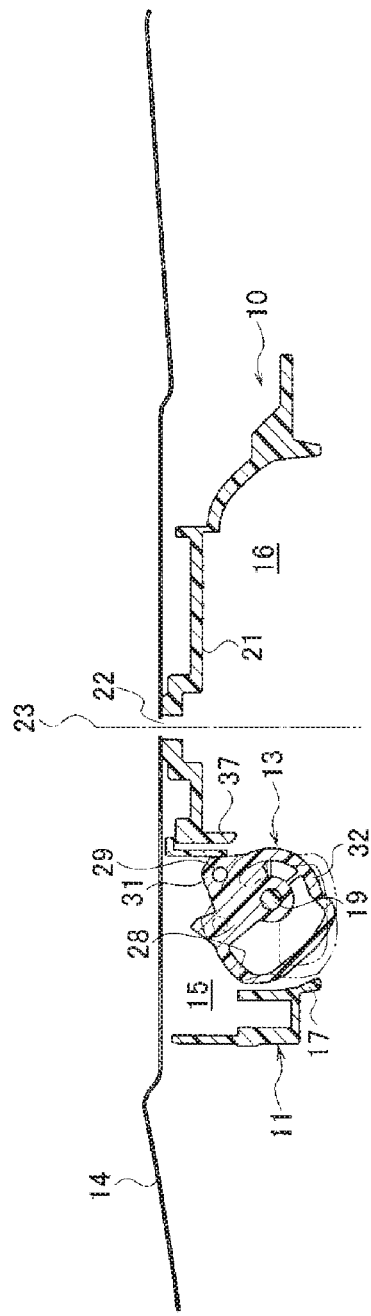
FIG. 4 is a cross-sectional view taken along a line B-B in FIG. 1 (illustrating an unlocked state).

The first protruding piece portion 42 is formed continuously to an end portion of the impact absorbing wall portion 38 opposite to the end portion to which the connecting portion 40 is connected (see FIGS. 3 to 5). This is because by making a propagation path of the vibration from the stopper portion 35 to the inner panel 14 detour as much as possible, the vibration generated in the stopper portion 35 is made difficult to be transmitted from the handle base 11 to the inner panel 14.

A thickness T3 of the first protruding piece portion 42 is formed to be thinner than the wall thickness T1 of the impact absorbing wall portion 38 (see FIG. 5), and is for example, about 0.5 mm to 1.0 mm. This is because by allowing the first protruding piece portion 42 to slightly bend at the time of the abutment on (collision with) the locking side stopper ridge 30 of the lock lever 13, the vibration is damped and the impact is absorbed by the small deflection deformation.

The impact absorbing portion 36 includes a second protruding piece portion (elastic portion) 44 protruding and extending from the first protruding piece portion 42. An auxiliary stopper (second stopper) 43 suppressing the rotation of the lock lever 13 is formed on the second protruding piece portion 44 when a rotating force exceeding the rotation range (locking side rotation limit) is applied to the lock lever 13. An extending direction of the second protruding piece portion 44 (the auxiliary stopper 43) is set to an angle substantially orthogonal to the first protruding piece portion 42. Further, in order to ensure rigidity of the auxiliary stopper 43 to a certain degree, the second protruding piece portion 44 does not have a full cantilever shape, and one-side end portion thereof is connected to the wall portion 45 constituting a part of the peripheral edge of the shaft support hole 15 (see FIGS. 9 and 10).

Similar to the first protruding piece portion 42, a thickness T4 of the second protruding piece portion 44 is formed to be thinner than the wall thickness T1 of the impact absorbing wall portion 38 (see FIG. 5), and is for example, about 0.5 mm to 1.0 mm. This is because by allowing the second protruding piece portion 44 to slightly bend at the time of the abutment on (collision with) the locking side stopper ridge 30 of the lock lever 13, the vibration is damped and the impact is absorbed by the small deflection deformation.

Although the auxiliary stopper 43 is provided at the impact absorbing portion 36 in the present embodiment, the auxiliary stopper 43 can be provided at a portion different from the impact absorbing portion 36.

On the other hand, the unlocking side stopper (unlocking side first stopper) 34 that defines the unlocking side rotation limit of the lock lever 13 is formed on the impact absorbing wall portion 38 (see FIG. 6). As described above, the wall thickness T1 of the impact absorbing wall portion 38 is formed to be thinner than the wall thickness T2 of the partition wall portion 37 constituting a part of the peripheral edge of the shaft support hole 15 of the handle base 11 (see FIGS. 5 and 6). This is because by allowing the impact absorbing wall portion 38 to slightly bend at the time of the abutment on (collision with) the lock lever 13, the vibration is damped and the impact is absorbed by the small deflection deformation.

Operational effects of the present embodiment will be described below.

(1) The inside handle device 10 includes the handle base 11 attached to the door panel of the vehicle (inner panel 14), the lock lever 13 rotatably supported on the handle base 11, the stopper portion 35 provided on the handle base 11 and limiting the rotation range of the lock lever 13, and the impact absorbing portion 36 provided on the handle base 11 and absorbing the impact generated by the contact of the lock lever 13 with the stopper portion 35.

According to the inside handle device 10, the impact absorbing portion 36 can absorb the impact generated by the contact (collision) between the lock lever 13 and the stopper portion 35 and reduce the hitting sound (impact sound) generated at the time of locking or unlocking the door by the lock lever 13.

(2) The impact absorbing portion 36 includes the impact absorbing wall portion 38 disposed apart from a general wall portion (partitioning wall portion 37) of the handle base 11.

By configuring the impact absorbing portion 36 in this way, the propagation path of the vibration from the stopper portion 35 to the inner panel 14 can be detoured as much as possible, and the vibration generated in the stopper portion 35 can be made difficult to be transmitted from the handle base 11 to the inner panel 14.

(3) The impact absorbing portion 36 includes the first protruding piece portion 42 protruding and extending from the impact absorbing wall portion 38. The stopper portion 35 includes the locking side stopper 33 defining the locking side rotation limit of the lock lever 13, and the locking side stopper 33 is formed on the first protruding piece portion 42 of the impact absorbing portion 36.

By configuring the impact absorbing portion 36 in this way, it is possible to damp and absorb the vibration generated at the time of the abutment on (collision with) the locking side stopper ridge 30 of the lock lever 13.

(4) The stopper portion 35 includes the unlocking side stopper 34 defining the unlocking side rotation limit of the lock lever 13, and the unlocking side stopper 34 is formed on the impact absorbing wall portion 38 of the impact absorbing portion 36.

By configuring the impact absorbing portion 36 in this way, it is possible to damp and absorb the vibration generated at the time of abutment on (collision with) the unlocking side stopper ridge 31 of the lock lever 13.

(5) The stopper portion 35 includes the auxiliary stopper 43 suppressing the rotation of the lock lever 13 when the rotating force exceeding the rotation range is applied to the lock lever 13.

By configuring the stopper portion 35 in this way, even when the handle base 11 is bent and deformed, the auxiliary stopper 43 can function as a stopper.

According to one or more embodiments, the inside handle device can reduce the hitting sound (impact sound) generated at the time of locking or unlocking the door by the lock lever.

By the way, although the inside handle device of the present invention has been described by taking the above embodiment as an example, the present invention is not limited to the embodiment and can adopt various other embodiments without departing from the spirit of the present invention.

What is claimed is:
1. An inside handle device comprising:
a handle base attached to a door panel of a vehicle;
a lock lever configured to be rotatably supported on the handle base;
a stopper portion provided on the handle base and configured to limit a rotation range of the lock lever; and
an impact absorbing portion provided on the handle base and configured to absorb an impact generated by a contact of the lock lever with the stopper portion;
wherein the impact absorbing portion includes a connecting portion and an impact absorbing wall;
wherein the connecting portion extends in a second direction substantially perpendicular to a first direction in which a general wall portion of the handle base and the impact absorbing wall extend, the connecting portion including one end connected to the general wall portion and another end connected to the impact absorbing wall,
wherein the impact absorbing wall is disposed apart from the general wall portion along the second direction with a slit therebetween, the impact absorbing wall including one end connected to the connecting portion and a free end opposite the one end,
wherein the free end is not directly connected to the general wall portion and is movable independent of the general wall portion;
wherein a wall thickness of the impact absorbing wall is less than a wall thickness of the general wall portion to which it is connected;
wherein the lock lever is configured to contact a wall surface of the impact absorbing portion;
wherein the impact absorbing portion includes a first protruding piece portion protruding and extending from the free end of the impact absorbing wall and disposed apart from the general wall portion;
wherein the stopper portion includes a locking side stopper defining a locking side rotation limit of the lock lever, and the locking side stopper is formed on the first protruding piece portion of the impact absorbing portion; and wherein the stopper portion includes an unlocking side stopper defining an unlocking side rotation limit of the lock lever, and the unlocking side stopper is formed on the impact absorbing wall of the impact absorbing portion.

2. The inside handle device according to claim 1,
wherein the stopper portion includes an auxiliary stopper suppressing rotation of the lock lever when a rotating force exceeding the rotation range is applied to the lock lever.

3. The inside handle device according to claim 1, wherein when the lock lever contacts the wall surface of the impact absorbing portion, the impact absorbing wall bends to absorb the impact.

* * * * *